Patented Nov. 28, 1922.

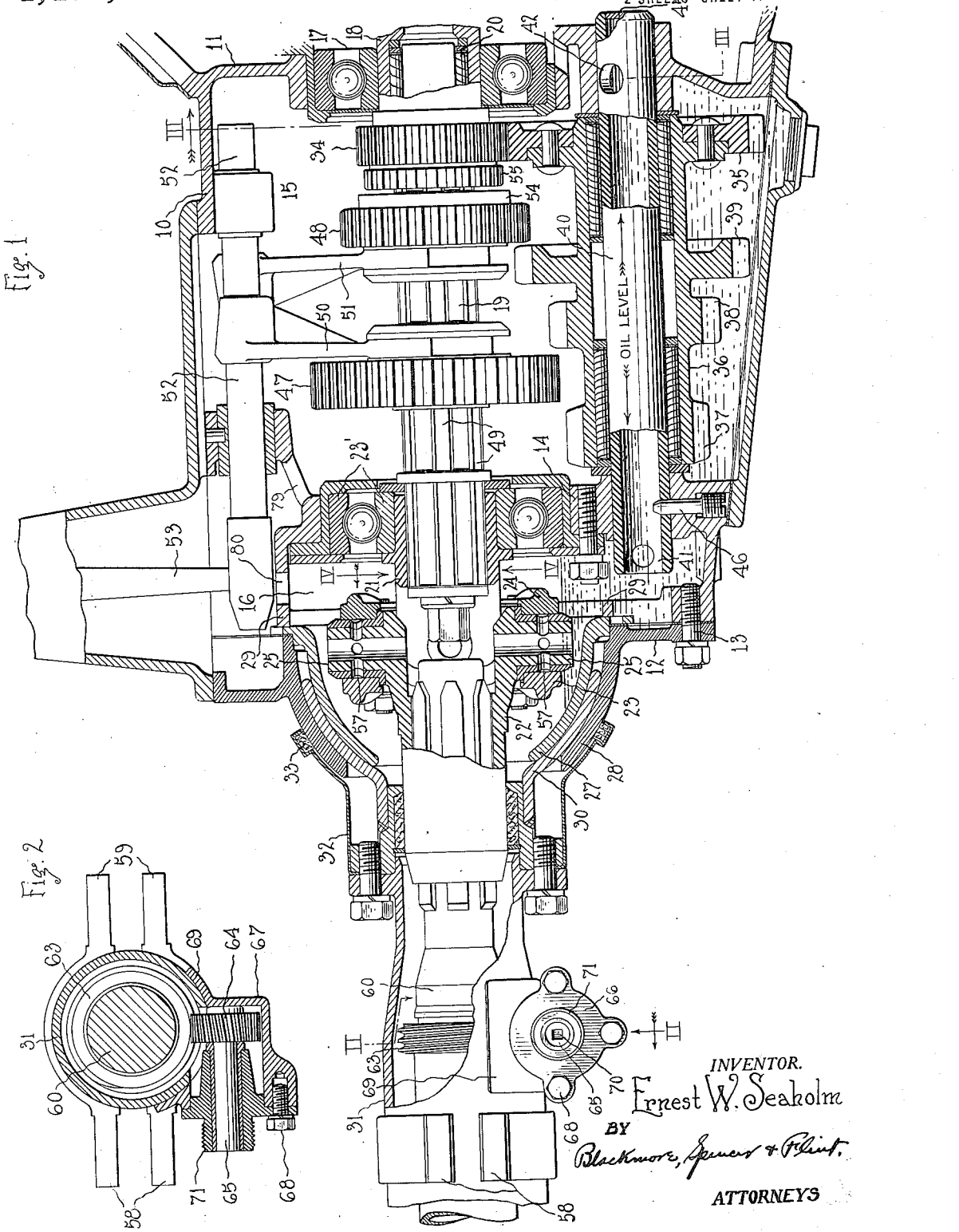

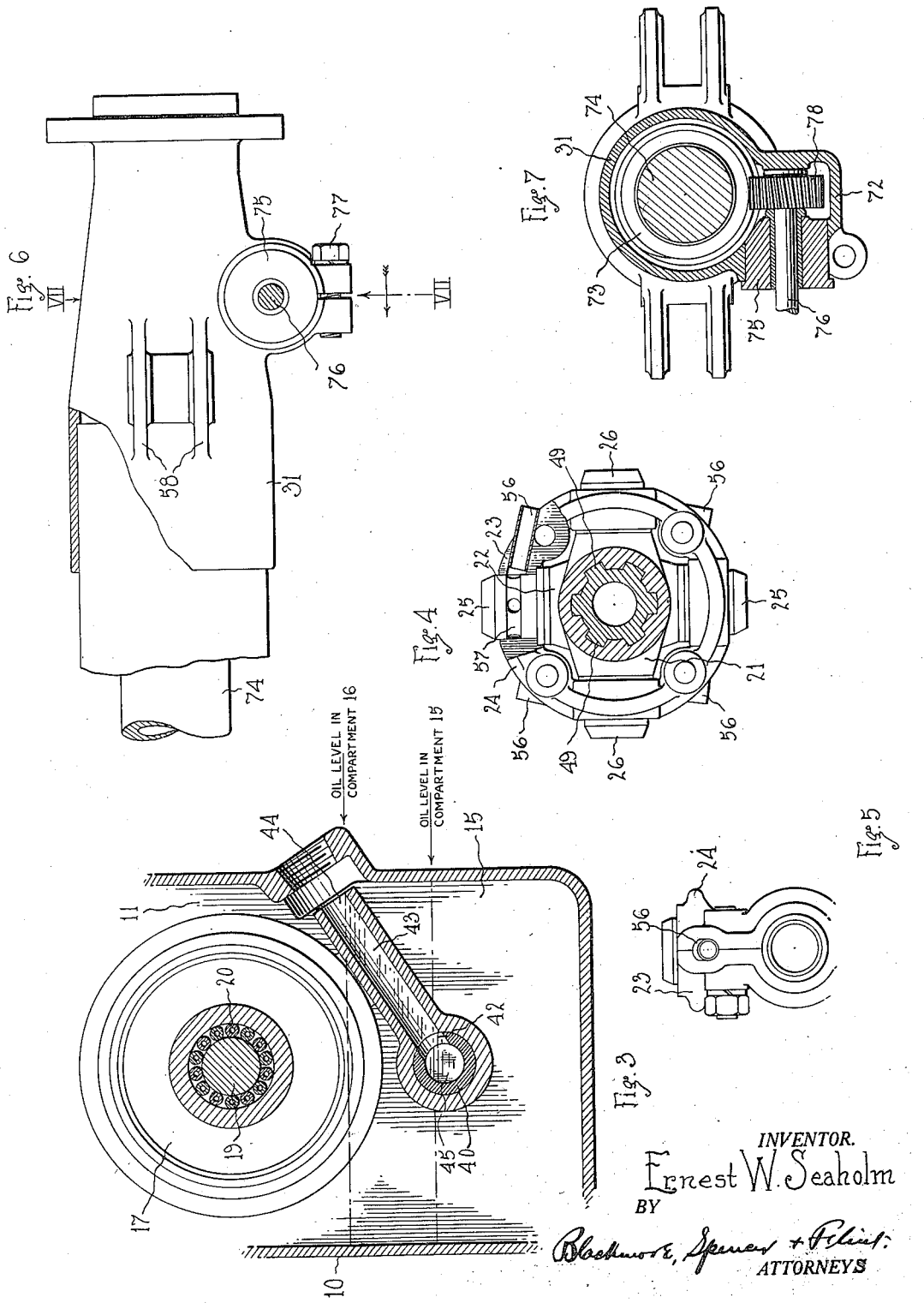

1,436,913

UNITED STATES PATENT OFFICE.

ERNEST W. SEAHOLM, OF DETROIT, MICHIGAN, ASSIGNOR TO GENERAL MOTORS CORPORATION, OF DETROIT, MICHIGAN, A CORPORATION OF DELAWARE.

TRANSMISSION MECHANISM FOR VEHICLES.

Application filed October 13, 1919. Serial No. 330,197.

*To all whom it may concern:*

Be it known that I, ERNEST W. SEAHOLM, a citizen of the United States, and resident of Detroit, Wayne County, State of Michigan, have invented certain new and useful Improvements in Transmission Mechanism for Vehicles, of which the following is a specification.

My invention relates to transmission mechanism through which the driving wheels of a motor vehicle are driven from the engine whereby the vehicle is operated, and the same comprises certain new and useful improvements in and relating to the lubricating system for accomplishing the lubrication of the change speed transmission gearing and the universal joint ordinarily employed in transmission mechanisms for motor vehicles; as well also as in certain new and useful improvements in and relating to driving mechanism associated with the transmission mechanism, and which driving mechanism is ordinarily employed for driving the speedometer, odometer, or other registering instrument used with the vehicle.

The principal object of my invention is to provide an improved lubricating device or system associated with the change speed transmission gearing, and with the universal joint through which motion is communicated to the rear axle of the vehicle; and by the use of which a constant circulation of oil is maintained past the parts of the transmission gearing and of the universal joint to be lubricated.

A further object of my invention is to provide a lubricating system associated with change speed gearing and with a universal joint located in separate compartments in a suitable casing, and in which a constant supply of the lubricant to the parts to be lubricated is secured; the level of the oil being maintained at a higher level in the universal joint compartment than in the compartment in which the change speed gears are located.

A further object of my invention is to provide certain new and useful improvements in and relating to various elements employed for the purpose of supplying lubricant to the parts to be lubricated, with the end in view of securing a constant circulation of oil past and a copious supply of lubricant to the parts to be lubricated.

A further object of my invention is to provide improved speedometer and odometer driving mechanism, the same being associated with the transmission gearing or with an element thereof and through which mechanism a speedometer, odometer, or other instrument may be driven.

With the above and other objects of invention in view, my invention consists in the improved transmission mechanism and associated elements and features illustrated in the accompanying drawings and herein-after described and claimed; and in such variations and modifications thereof, within the scope of the concluding claims, as will be obvious to those skilled in the art to which my invention relates.

Referring to the drawings:

Figure 1 is a view showing a section of a change speed transmission gearing upon a vertical central plane extending longitudinally thereof, and to which my invention is applied.

Figure 2 is a view showing a section upon a transverse plane indicated by the line II—II, Figure 1, looking toward the left.

Figure 3 is a view showing a section upon a vertical transverse plane indicated by the line III—III, Figure 1, looking toward the right.

Figure 4 is a view showing the universal joint present in the mechanism illustrated, the view being a section upon a transverse plane indicated by the line IV—IV, Figure 1, looking toward the left.

Figure 5 is a fragmentary view showing the universal joint shown in Figure 4 as seen in side elevation.

Figure 6 is a view showing a modified form of certain features of my invention.

Figure 7 is a view showing a section upon a transverse plane indicated by the line VII, VII, Figure 6.

Referring now to the drawings wherein the preferred embodiment of my invention is illustrated; the reference numeral 10 designates a gear casing within which the change speed transmission gears ordinarily employed are located; the right-hand end of said gear casing or housing being closed by a head 11 shown as formed integrally with the casing, and the left-hand end of said casing being closed by a detachable head 12 secured in place by suitable bolts 13. The casing 10 is also provided with a transverse partition 14 which divides the same into a larger speed change gear compartment 15 and a smaller universal joint compartment 16.

The head 11 is provided with a seat within which a ball bearing 17 is located, and which ball bearing serves as a support for the rear end of a drive shaft 18 which is driven from the engine of the vehicle. Concentric with the shaft 18 is a main driving shaft 19, the right-hand end of which is supported by bearings 20 located in a recess provided in the end of the shaft 18, while the left-hand end of said shaft is connected with and drives one member 21 of the universal joint, said member being supported within and by a ball or other form of bearing 23' which in turn is supported in an opening provided in the partition 14.

The reference numeral 22 designates a second and driven member of the universal joint, and 23 and 24 are two ring members through which the driven member is driven from the driving member 21 of the universal joint and which members are secured together by bolts. These ring members when secured together provide two pairs of bearings located at right angles to one another and within two of which bearings oppositely located hollow trunnions 25 of the universal joint member 22 are supported, while the two trunnions 26 of the universal joint member 21 are supported within the other pair of bearings, and which are located at right angles to the axis of the pair of bearings within which the trunnions of the first mentioned member 22 are supported.

The left-hand end or cover 12 of the casing 10 is provided with a shell 27 spherical in form, and the reference numeral 28 designates a second similarly shaped projection or shell spaced apart from the shell 27 so as to leave space between them in the form of the shell of a hollow sphere; the last mentioned member being held in place between the inner end of the head or cover 12 and suitable abutments 29 formed with the casing 10, as clearly shown in Figure 1 of the drawing.

The reference numeral 30 designates the end of a torque tube extending from the transmission casing to the rear axle of the vehicle and the main body of which is designated by the reference numeral 31. The forward end 30 of this tube is in the form of a shell of a sphere and fits between the spherical extensions 27, 28 above referred to, so that the torque tube is capable of slight movement angularly in any direction relative to the axis of the main driving shaft; such movement being permitted by the inter-engaging spherical projections above referred to. The torque tube is provided with a dust excluding shield 32 having a packing 33 which contacts with the exterior of the spherical projection 28 to thereby prevent the entrance of dust into the joint between the spherical surfaces above referred to.

The shaft 18 which is driven from the engine as above explained is provided with a gear 34 in mesh with a gear 35 carried by a counter-shaft 36. This counter-shaft is shown as formed integrally with change speed gears 37, 38, 39, but the same may obviously be made separate from the gears which it carries and the gears secured in place thereupon in any way should it be deemed desirable to do so. The counter-shaft in question is hollow, and is supported upon a non-rotating hollow shaft 40 in the embodiment of my invention illustrated, said shaft being supported, respectively, in openings provided in the head 11 and in the partition 14.

The left-hand end 41 of the shaft 40 is in permanently open communication with the universal joint compartment 16 within the casing 10, while the right-hand end of said shaft is provided with a hole 42 which communicates with an angularly disposed upwardly extending stand pipe or passage 43 formed, preferably, in the head 11, by providing a passage therein, and the open upper end 44 of which stand pipe is in communication with and discharges into the gear compartment 15 within the casing 10. The right-hand end of the hollow shaft 40 is closed as by a plug 45 and a threaded pin 46 is provided for holding the hollow shaft in place, and in a position such that the hole 42 will communicate with the lower end of the stand pipe 43.

The main driving shaft 19 is splined, and the reference numerals 47, 48 designate two gears slidable thereupon but non-rotatable relative thereto, because of lugs extending into the spaces between the splines 49 with which the driving shaft is provided.

The hubs of the gears 47, 48 are provided with grooves into which the free lower ends of two yokes 50, 51 extend, and which yokes are operated by two sliding gear shifting rods, one of which is shown at 52 and either one of which may be operated by a gear shifting lever 53, as is usual in change speed gear mechanism. The gear 48 is also provided with an interiorly toothed clutch ring 54 adapted to engage the teeth of a clutch member 55 formed integrally with the gear 34 when said gear is moved to the right, to thereby connect the shaft 18 which drives the gear 34 directly with the main driving shaft 19 through the said clutch ring 54; the gear 48 and the sliding connection between said gear and the main driving shaft thereby providing for direct driving of the said shaft 19 from the engine driven shaft 18, as will be appreciated.

The universal joint ring made up with the members 23, 24 is provided with a plurality of tubes 56 secured in place in registering recesses formed in the meeting surfaces of the said members, and which tubes act as scoops which dip into the body of oil within the universal joint compartment 16 as the universal joint rotates; thus taking up oil from the main body of the oil in the said compartment and supplying it to the bearings provided in the universal joint ring for the trunnions 25—25 and 26—26; the several bearings being provided with oil grooves as shown at 57, Figure 4, in order to secure an effective distribution of the oil to all parts of the trunnion joints of the driving and driven members 21, 22 of the universal joint.

The torque tube 31 is provided with oppositely located ears or lugs 58, 59, see Figure 2, between which the forward ends of reach rods, which extend to the rear axle of the vehicle and act to brace the same, are secured, and the reference numeral 60 designates a driving or propeller shaft which extends through the torque tube and the rear end of which is operatively connected with the usual differential gearing and through it with the rear driving axles. This driving shaft is splined at its forward end and extends into the universal joint member 22 to thereby provide for the driving of the shaft, as clearly shown in Figure 1; and the said shaft is provided with a worm gear 63 which engages with and drives a pinion 64 fast upon the inner end of a speedometer drive shaft 65. The shaft 65 is supported in a bearing 66 carried by a housing or casing 67 by means of cap screws 68; and which housing is secured over an opening provided in the torque tube 31, as best shown in Figure 2, by welding, riveting, or otherwise securing the base or plate 69 of said casing to the wall of the torque tube. It therefore follows that driving mechanism for the speedometer, odometer, or other instrument is provided without specially designing the torque tube with that end in view, it being merely necessary to provide an opening in the torque tube and to secure the housing or casing 67 which carriers the speedometer drive shaft in place over the opening in a position such that the worm 63 meshes with the gear 64 carried by the speedometer drive shaft. The speedometer drive shaft is provided with an opening 70 into which the end of a flexible drive shaft whereby the speedometer is driven extends, and a threaded nipple 71 is provided upon the bearing 66 for receiving the end of the ordinary protecting casing or sheath of the flexible drive shaft.

Figures 6 and 7 show a form of speedometer drive in which an integral projection or boss 72 is provided adjacent a worm gear 73 upon the propeller shaft 74, which projection is provided with a circular seat adapted to receive a bearing 75 for a speedometer drive shaft 76, the casing 72 being split and the parts thereof drawn together by a bolt 77 to thereby clamp the bearing 75 in place, and the shaft 76 being provided with a gear 78 in mesh with the worm 73. In both forms of speedometer drive illustrated it will be appreciated that the axes of the propeller and speedometer drive shafts extend at right angles to one another, and are spaced the proper distance apart to provide for the intermeshing of the worm and pinion through which the speedometer driving shaft is driven.

When the gearing within the gear compartment 15 is in operation it will be understood that oil will be splashed against the interior of the wall of the casing, which oil will find its way into the several bearings to which it has access; some of the oil passing through the ball bearing 23 and directly into the universal joint compartment 16, while other oil will be thrown upward about the bearings for the gear shifting rods 52, and through openings 79, 80 in the internal web structure which provides the partition 14 and the abutments 29; the oil being thus supplied to the universal joint compartment 16 by the action of the several gears in the gear compartment 15.

Oil will thus be continuously supplied to the universal joint compartment 16 when the gearing is in operation, thereby maintaining a constant body of oil therein. As the level of oil within said compartment rises the oil will flow therefrom through the hollow shaft 40, the opening 42, and upward through the stand pipe 43; the overflow of oil from the upper end 44 of said stand pipe being directly into the gear compartment 15 of the casing 10. A constant level of oil is thus maintained within the universal joint compartment 16, and a constant flow of oil occurs therefrom through the shaft 40 and back into the gear compartment 15; thus maintaining a circulation of oil throughout the lubricating system when the device is in operation and a copious supply of oil to all the parts of the transmission mechanism to be lubricated.

The overflow from the compartment 16 provided by the hollow shaft 40, and the stand pipe 43 maintains a constant level of oil within the universal joint compartment; and the construction of the partition 14 is such that oil cannot readily pass through the bearing 23′ and directly from one of the compartments 15, 16 to the other, due to tipping of the vehicle, the splashing of the oil, or other cause. The total quantity of oil within the transmission casing 10 is preferably such that the level of oil within the gear compartment 15 is substantially below the level within the universal joint compartment 16, as indicated in Figures 1 and 3, although the level within the compartment 15 may obviously be raised by adding oil to the system. Ordinarily, however, the parts will perform their intended function and operate as hereinbefore explained if the gears 35, 37, 38, and 39 are but partially submerged, as in that event oil will be thrown up and will find its way into the universal joint compartment; while the overflow provided by the shaft 40 and stand pipe 43 will maintain the level within the said compartment at such a height that the scoops 56 will dip into the body of oil and thus provide proper lubrication for the bearings of the universal joint.

While in describing my invention I have referred to the particular form of gearing illustrated, and also to the particular form of universal joint shown, it will be appreciated that my invention, regarded in its broader aspects, is in no way limited to any particular form or construction of these elements; and that the same is capable of use with forms of change speed gearing and of universal joint other than the particular forms illustrated and herein described, so long as the operation of the resulting structure is substantially as herein described, and so long as the same is within the scope of the concluding claims wherein the distinguishing features of my invention are pointed out.

It will also be appreciated that the passage through which oil flows from the universal joint to the gear compartment may be formed in a shaft which rotates with and in fact provides a counter shaft whereby gears like the gears 35, 37, 38, 39 are supported; the essential feature in this respect being that the oil flows from the universal joint to the gear compartment through a conduit concentric with the counter shaft or through and along the said shaft.

Having thus described and explained my invention, I claim and desire to secure by Letters Patent:

1. In combination with transmission gearing comprising a gear casing having an end wall, gear and universal joint compartments separated by a partition, and change speed gear mechanism located within said gear compartment and including a main driving shaft, and a countershaft driven by said main driving shaft; a hollow shaft supported in openings provided in said end wall and in said partition and upon which said counter shaft is supported, and one end of which hollow shaft is in open communication with the interior of the universal joint compartment aforesaid; and an upwardly extending stand pipe with which the other end of said hollow shaft communicates, and the open upper end of which stand pipe is in permanently open communication with the interior of said gear compartment.

2. The combination with transmission gearing comprising a gear casing having an end wall, gear and universal joint compartments separated by a partition, and change speed gear mechanism located within said gear compartment and including a main driving shaft and a counter shaft driven by said main driving shaft; of means for providing a passage extending from said universal joint compartment through and along said counter shaft and into said gear compartment the discharge end of said passage being at a higher level than the inlet end thereof.

3. In combination with transmission gearing comprising a gear casing having an end wall, gear and universal joint compartments separated by a partition, and change speed gear mechanism located within said gear compartment and including a main driving compartment, a countershaft, and gears carried by said shafts and adapted to mesh with one another; a hollow shaft supported in openings provided in said end wall and in said partition and by which said countershaft is supported, and one end of which hollow shaft is in open communication with the interior of the universal joint compartment aforesaid; and an upwardly extending stand pipe formed in said end wall and with which the other end of said hollow shaft communicates, and the open upper end of which stand pipe is in permanently open communication with the interior of said gear compartment.

4. In combination with transmission gearing comprising a gear casing having gear and universal joint compartments separated by a partition, and change speed gear mechanism located within said gear compartment and including a main driving shaft and a counter shaft driven by said main driving shaft; a hollow shaft upon which said countershaft is supported and one end of which shaft is in open communication with the interior of the universal joint compartment aforesaid; and an upwardly extending stand pipe with which the other end of said hollow shaft communicates, and the open upper end of which stand pipe is in permanently open communication with the interior of said compartment.

5. The combination with transmission gearing comprising a gear casing having gear and universal joint compartments separated by a partition, and change speed gear mechanism located within said gear compartment and including a main driving shaft and a counter shaft driven by said main driving shaft; of means for providing a passage extending along the axis of said counter shaft and between said universal joint and gear compartments, and through which oil may flow from one of said compartments to the other.

6. The combination with transmission gearing comprising a gear casing having gear and universal joint compartments separated by a partition, and change speed gear mechanism located within said gear compartment and including a main driving shaft and a counter shaft driven by said main driving shaft; of means for providing a passage extending along the axis of said counter shaft and between said universal joint and gear compartments, the inlet end of said passage being at a lower level than the outer end thereof and which passage discharges into said gear compartment.

7. In combination with transmission gearing comprising a gear casing having gear and universal joint compartments separated by a partition; a universal joint located within said universal joint compartment and comprising two rotating members having trunnions arranged at right angles to one another, and a universal joint ring having bearings for receiving said trunnions; means for supplying oil to said universal joint compartment from said gear compartment; scoops carried by said universal joint ring and adapted to dip into the oil in the universal joint compartment to thereby supply oil to the bearings for said trunnions; and a passage leading from said universal joint compartment and discharging into said gear compartment whereby a constant level of oil is maintained in said universal joint compartment.

8. The combination with transmission gearing comprising a gear casing having gear and universal joint compartments separated by a partition, change speed gear mechanism located within one of said compartments, and a universal joint located within the other of said compartments; of means whereby oil from said gear compartment may be supplied to said universal joint compartment; and means for providing a passage leading from said universal joint compartment back to and discharging into said gear compartment, whereby a constant circulation of oil is maintained.

9. In combination with transmission gearing comprising a gear casing having gear and universal joint compartments separated by a partition, change speed gear mechanism located within one of said compartments, and a universal joint located within the other of said compartments; means whereby oil from said gear compartment may be supplied to said universal joint compartment; and means for providing a passage leading from said universal joint compartment back to and discharging into said gear compartment; the discharge end of said passage being at a higher level than the inlet end thereof whereby a constant level of oil is maintained in said universal joint compartment and a circulation of oil is secured.

10. In combination with transmission gearing, and a torque tube extending from said gearing; a propeller shaft within and extending along said torque tube; a worm gear carried by said propeller shaft; a housing separate from said torque tube and secured in place over an opening provided therein; a bearing carried by said housing; a drive shaft supported by said bearing; and a pinion carried by said drive shaft and located within said housing, the location of the parts being such that said pinion meshes with the worm gear upon said propeller shaft.

11. The combination with transmission gearing comprising a gear casing having a gear and universal joint compartment separated by a partition, change speed gear mechanism located within one of said compartments, and a universal joint located within the other of said compartments; of means whereby oil from said gear compartment is supplied to said universal joint compartment; and means for maintaining a level of oil in said universal joint compartment higher than the level of oil in said change speed gear compartment.

12. The combination with transmission gearing comprising a gear casing having a gear and universal joint compartment separated by a partition, change speed gear mechanism located within one of said compartments, and a universal joint located within the other of said compartments; of means for supplying oil to said universal joint compartment; means for discharging oil from said universal joint compartment into said change speed gear compartment; and means for maintaining a higher level of oil within said universal joint compartment than in said change speed gear compartment.

13. In a transmission mechanism for motor vehicles and the like a transmission chamber, a ball and socket joint adjacent said chamber, a universal joint inclosed within said ball and socket joint, and a jack shaft extending through said chamber, said shaft being hollow and adapted to convey the lubricant to said ball and socket joint.

14. In a transmission mechanism for motor vehicles, comprising in combination, a gear casing having an end wall, gear and universal joint compartments separated by a partition, change speed gear mechanism disposed within said gear compartment and including a counter shaft, a hollow shaft supported in openings provided in said end wall and in said partition and upon which said counter shaft is mounted, one end of said hollow shaft being in open communication with the interior of the universal joint compartment, and an upwardly extending stand pipe with which the other end of said hollow shaft is in communication, the open upper end of said stand pipe being permanently in open communication with the interior of said gear compartment.

15. In a transmission mechanism for motor vehicles, comprising in combination, a gear casing having an end wall, gear and universal joint compartments separated by a partition, change speed gear mechanism disposed within said gear compartment and including a counter shaft, and means providing a passage extending from said universal joint compartment through and along said counter shaft and into said gear compartment, the discharge end of said passage being at a higher level than the inlet end thereof.

16. A transmission mechanism for motor vehicles, comprising in combination, a gear casing having an end wall, gear and universal joint compartments separated by a partition, change speed gear mechanism disposed within said gear compartment and including a driving shaft, a counter shaft, and gears carried by said shafts and adapted to mesh with one another; a hollow shaft supported in openings provided in said end wall and in said partition and by which said counter shaft is supported, one end of said hollow shaft being in communication with the interior of the universal joint compartment and an upwardly extending stand pipe formed in said end wall and with which the other end of said hollow shaft is in communication, the open upper end of said stand pipe having permanent open communication with the interior of said gear compartment.

17. A transmission mechanism for motor vehicles, comprising in combination a gear casing having gear and universal joint compartments separated by a partition, change speed gear mechanism located within said gear compartment and including a counter shaft; a hollow shaft upon which said counter shaft is mounted and one end of which hollow shaft is in open communication with the interior of the universal joint compartment; and an upwardly extending stand pipe with which the other end of said hollow shaft has communication, the open upper end of said stand pipe being in permanent open communication with the interior of said gear compartment.

18. In a transmission mechanism the combination of a transmission casing, a hollow jack shaft extending longitudinally thereof, a transverse partition in said transmission case rotatably supporting a universal joint, a ball and socket joint associated with and rotatably supporting said universal joint, and housing means associated with said transmission case to secure said ball and socket joint thereto, the latter forming a chamber in which said universal joint is adapted to rotate, said jack shaft communiating with said chamber for supplying lubricant thereto.

19. In a transmission mechanism the combination of a transmission casing, a housing associated with said casing and forming a chamber therein for enclosing the transmission mechanism, a pair of transverse partitions and a hollow jack shaft extending longitudinally of said casing and seatable in said partitions, a conduit formed in one of said partitions and communicating with said hollow jack shaft, said jack shaft extending through the other partition and communicating with the chamber in said housing.

20. A transmission mechanism for motor vehicles including in combination, a casing, a change speed device therein, a chamber at the rear of said casing having communication with the interior thereof at a higher eletion than the normal level of lubricant in said casing, a universal joint in said chamber, and means providing a passage from the lower part of said chamber to a point adjacent the front of said casing, the front end of said passage being in communication with the interior of said casing substantially at the same elevation as the desired level of lubricant in said chamber.

21. A transmission mechanism for motor vehicles including in combination, a casing, a housing, and a lubricant conduit extending from said housing to the front of said casing and having communication with the interior thereof, the casing end of said conduit being at a higher elevation than the housing end and means in addition to said conduit affording communication between said housing and casing at an elevation not lower than the casing end of said conduit.

In testimony whereof I affix my signature.

ERNEST W. SEAHOLM.